United States Patent
Korenaga

(10) Patent No.: US 11,319,850 B2
(45) Date of Patent: *May 3, 2022

(54) ABNORMALITY DETECTION APPARATUS FOR ELECTRICALLY HEATED CATALYST

(71) Applicant: TOYOTA JIDOSHA KABUSHIKI KAISHA, Aichi-ken (JP)

(72) Inventor: Shingo Korenaga, Shizuoka (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 23 days.

This patent is subject to a terminal disclaimer.

(21) Appl. No.: 16/744,177

(22) Filed: Jan. 16, 2020

(65) Prior Publication Data
US 2020/0232373 A1 Jul. 23, 2020

(30) Foreign Application Priority Data
Jan. 17, 2019 (JP) .............................. JP2019-006366

(51) Int. Cl.
F01N 11/00 (2006.01)
F01N 3/20 (2006.01)

(52) U.S. Cl.
CPC ............ *F01N 3/2013* (2013.01); *F01N 11/00* (2013.01); *F01N 2240/16* (2013.01); *F01N 2550/22* (2013.01); *F01N 2900/0602* (2013.01)

(58) Field of Classification Search
CPC .............. F01N 3/2013; F01N 2240/16; F01N 2550/22; F01N 2900/0602
See application file for complete search history.

(56) References Cited

U.S. PATENT DOCUMENTS 5,555,725 A * 9/1996 Shimasaki ............ F01N 3/2013
60/277
5,758,492 A * 6/1998 Kato ....................... F01N 11/00
60/274

(Continued)

FOREIGN PATENT DOCUMENTS

| JP | 2000-220443 A | 8/2000 |
| JP | 2011231708 A | 11/2011 |
| JP | 201440789 A | 3/2014 |

OTHER PUBLICATIONS

Office Action in U.S. Appl. No. 16/744,883, dated Aug. 23, 2021, 21pp.

(Continued)

*Primary Examiner* — Jonathan R Matthias
(74) *Attorney, Agent, or Firm* — Hauptman Ham, LLP

(57) ABSTRACT

An abnormality detection apparatus calculates an accomplishment ratio parameter based on an actually supplied electrical energy defined as the integrated value of electrical power actually supplied to the electrically heated catalyst over a specific period from the start of supply of electrical power to the electrically heated catalyst to a specific time and a target electrical energy defined as the integrated value of target electrical power over the specific period. The accomplishment ratio parameter is a parameter relating to the ratio of the actually supplied electrical energy to the target electrical energy. The abnormality detection apparatus detects an abnormality of the electrically heated catalyst on the basis of the accomplishment ratio. The specific time is a time after the start of supply of electrical power to the electrically heated catalyst and before or simultaneous with the time when the actually supplied electrical power substantially reaches the target electrical power.

4 Claims, 6 Drawing Sheets

(56) References Cited

U.S. PATENT DOCUMENTS

| | | | |
|---|---|---|---|
| 6,185,931 B1 * | 2/2001 | Shimasaki | F01N 3/22 |
| | | | 60/277 |
| 2009/0211233 A1 | 8/2009 | Watanabe et al. | |
| 2011/0118924 A1 | 5/2011 | Nasu et al. | |
| 2011/0268613 A1 | 11/2011 | Hirai et al. | |
| 2012/0004801 A1 | 1/2012 | Watanabe | |
| 2012/0247090 A1 | 10/2012 | Yoshioka et al. | |
| 2013/0298535 A1 * | 11/2013 | Aoki | F02D 41/1466 |
| | | | 60/276 |

OTHER PUBLICATIONS

Office Action in U.S. Appl. No. 16/744,184, dated Aug. 24, 2021, 25pp.
Office Action in U.S. Appl. No. 16/744,180, dated Sep. 1, 2021, 21pp.
Notice of Allowance in U.S. Appl. No. 16/744,883, dated Dec. 23, 2021, 14pp.
Notice of Allowance in U.S. Appl. No. 16/744,184, dated Dec. 20, 2021, 17pp.
Notice of Allowance in U.S. Appl. No. 16/744,180, dated Dec. 20, 2021, 23pp.

* cited by examiner

[Fig. 1]
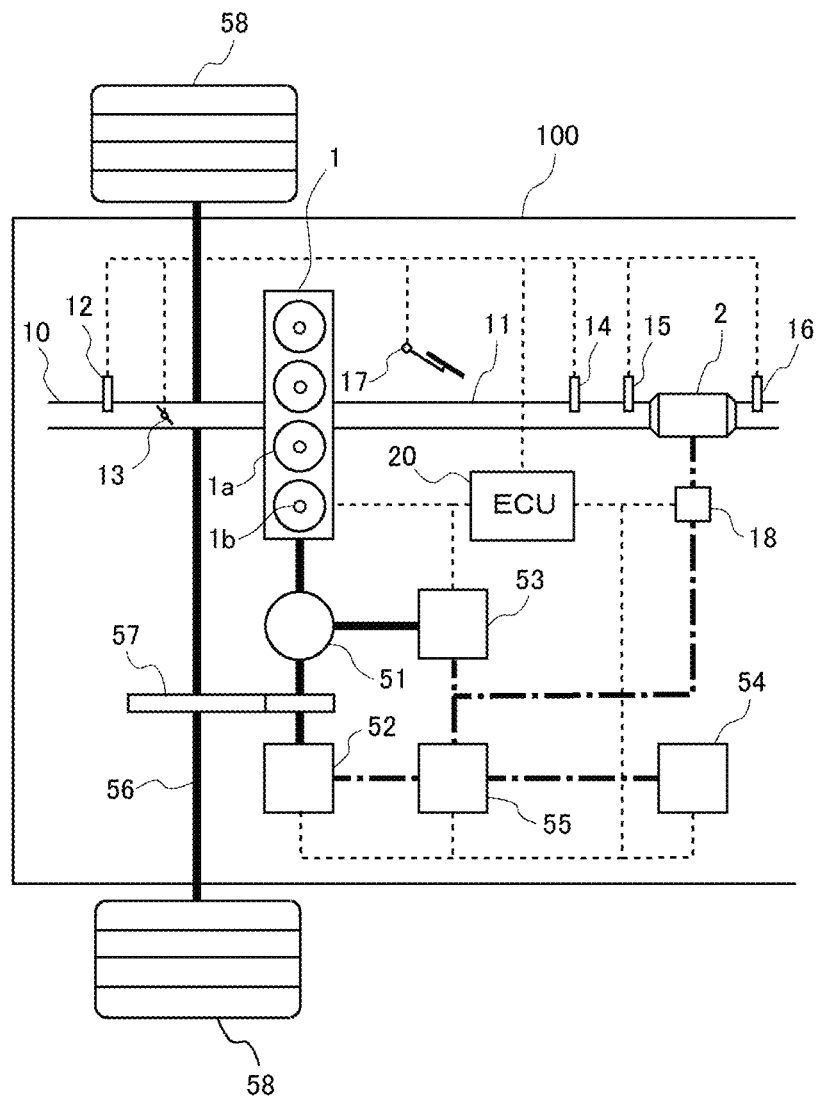

[Fig. 2]
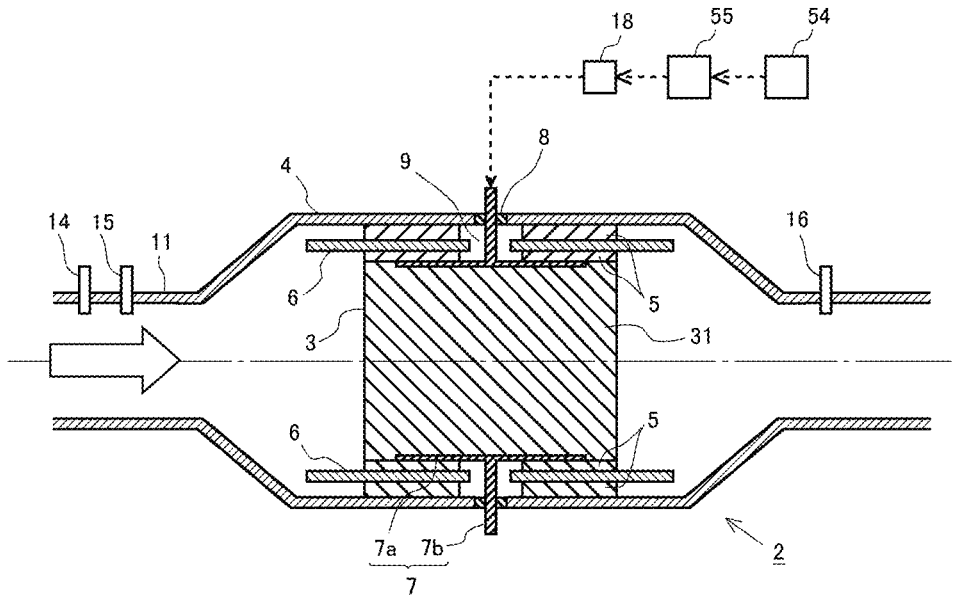
[Fig. 3]
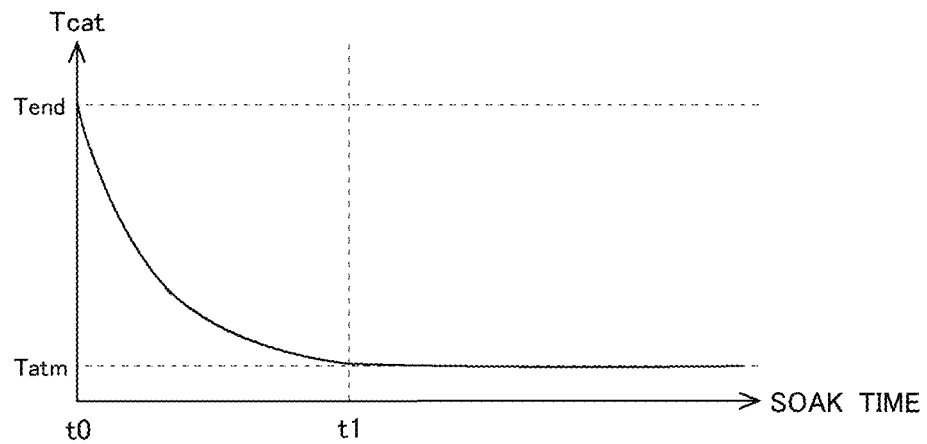

[Fig. 4]
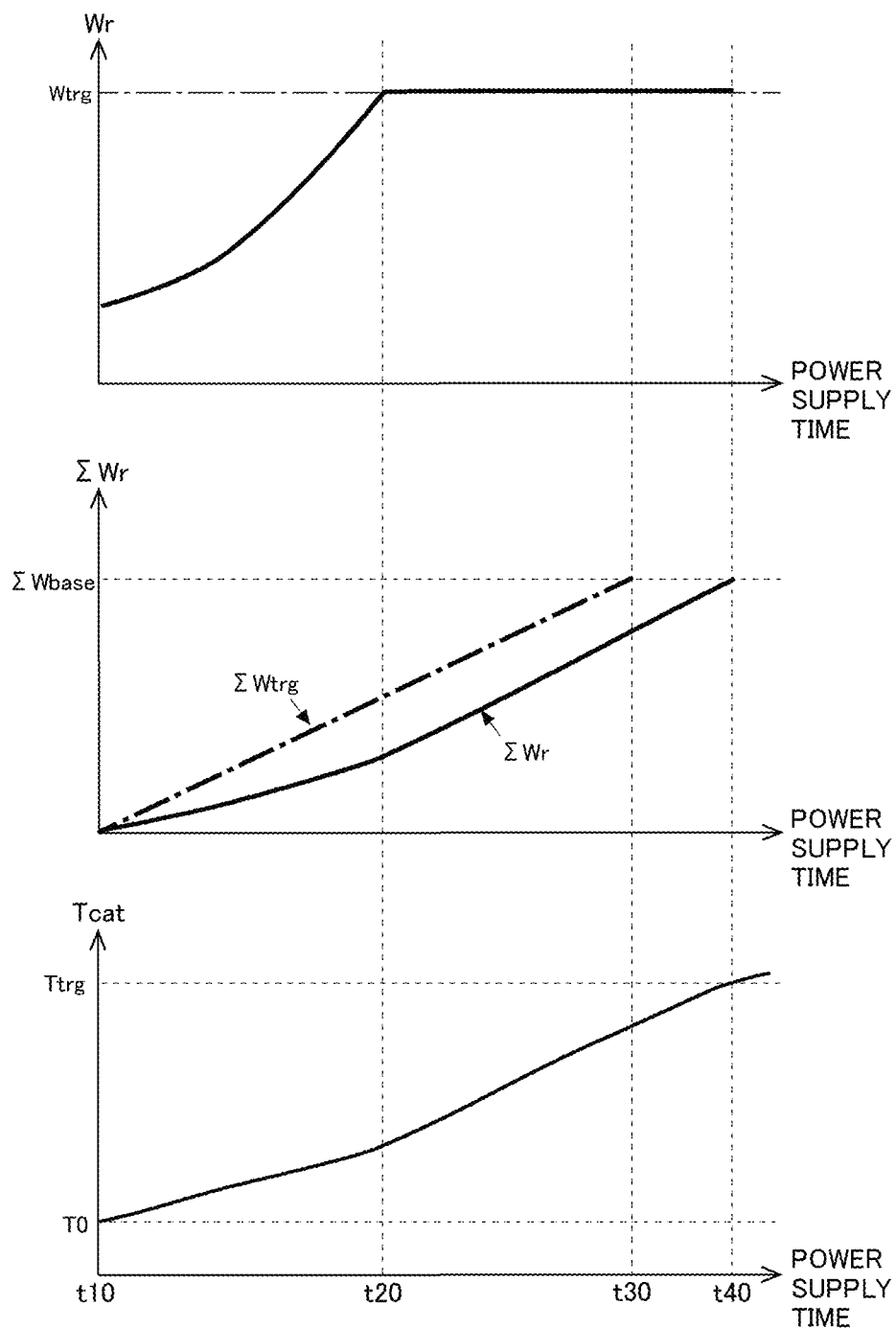

[Fig. 5]
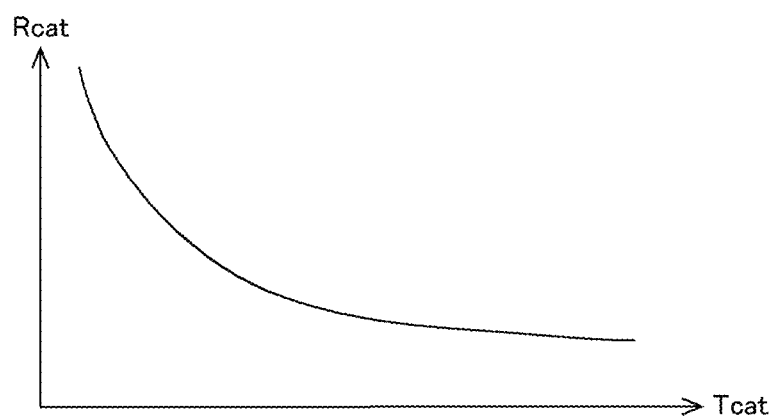

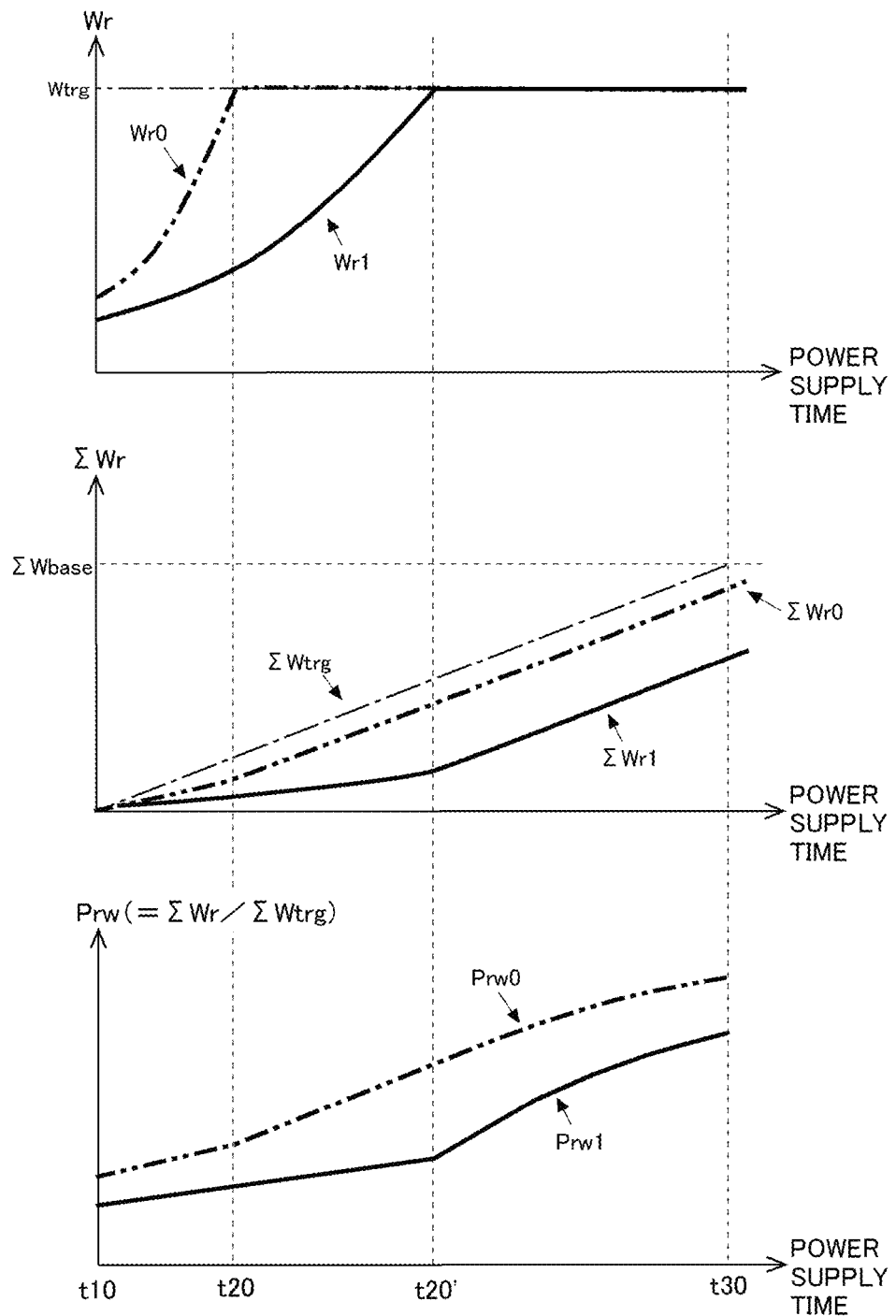
[Fig. 6]

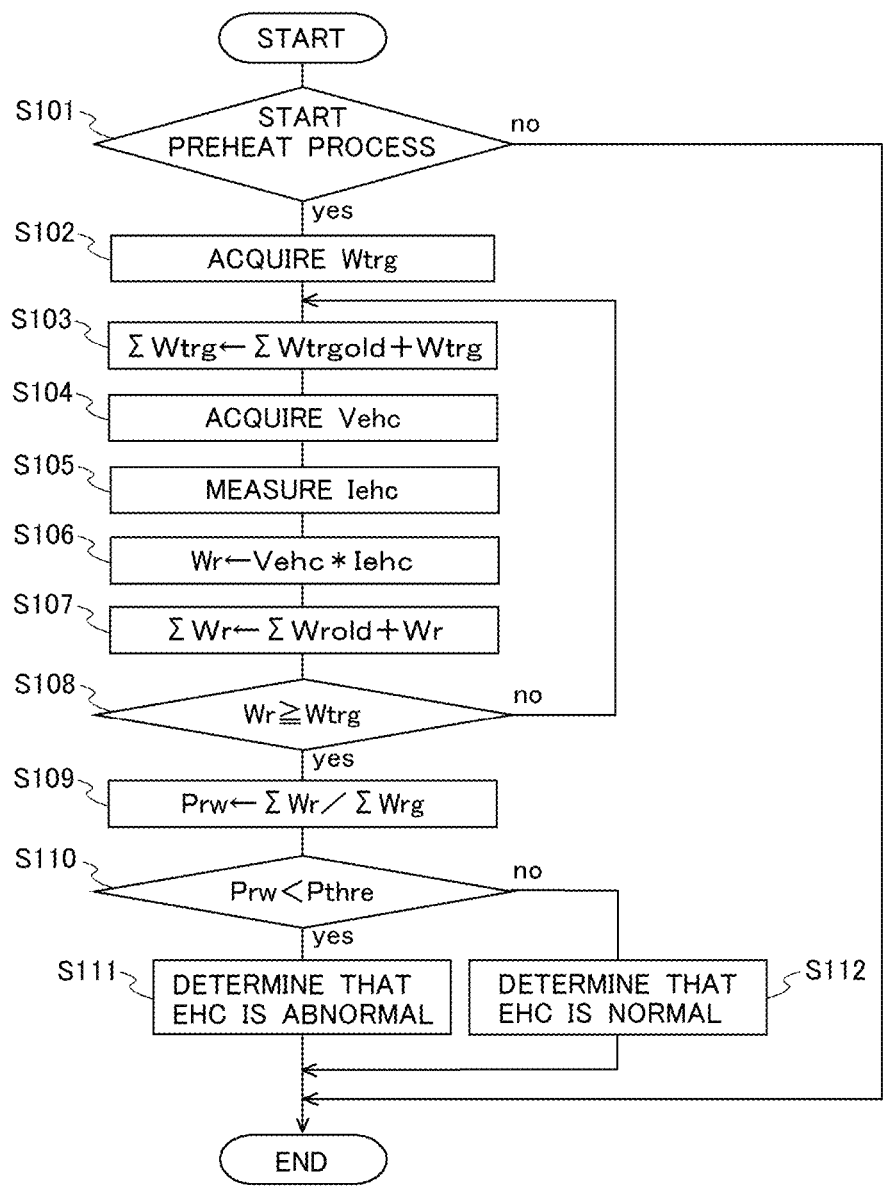

ABNORMALITY DETECTION APPARATUS FOR ELECTRICALLY HEATED CATALYST

CROSS-REFERENCE TO RELATED APPLICATIONS

This application claims the benefit of Japanese Patent Application No. 2019-006366, filed on Jan. 17, 2019, which is hereby incorporated by reference herein in its entirety.

BACKGROUND

Technical Field

The present disclosure relates to an abnormality detection apparatus for an electrically heated catalyst.

Description of the Related Art

There are known exhaust gas purification apparatuses for internal combustion engines that include an exhaust gas purification catalyst adapted to be heated by a heating element that is energized electrically. Such a catalyst will also be referred to as "electrically heated catalyst" hereinafter. The electrically heated catalyst of such an exhaust gas purification apparatus for an internal combustion engine is energized (or supplied with electrical power) before the startup of the internal combustion engine to reduce exhaust emissions during and/or just after the startup of the internal combustion engine.

If the electrically heated catalyst has an abnormality or problem, there may be cases where it is not heated to an intended temperature even if a normal amount of electrical energy is supplied to it. It is known to detect an abnormality of an electrically heated catalyst by comparing the integrated value of electrical power actually supplied to the electrically heated catalyst (which will be hereinafter referred to as "actual electrical power") and the integrated value of a standard electrical power (see, for example, Patent Literature 1 in the citation list below).

CITATION LIST

Patent Literature

Patent Literature 1: Japanese Patent Application Laid-Open No. 2000-220443

SUMMARY

In cases where the base material of the heating element of the electrically heated catalyst is a material whose electrical resistance decreases with rise of temperature (namely, a material having NTC characteristics), such as SiC, there is a possibility that the accuracy of abnormality detection may be deteriorated due to influence of the temperature of the heating element on the actual electrical power. In particular, at high temperatures, where the electrical resistance of the heating element is low, the current that flows in the electrically heated catalyst per unit time tends to be large. Then, even if the electrically heated catalyst has an abnormality, the difference between the actual electrical power and the standard electrical power may decrease to make the difference between integrated value of the actual power and the integrated value of the standard electrical power small. This may make it difficult to detect an abnormality of the electrically heated catalyst with high accuracy.

The present disclosure has been made in the above circumstances, and an object of the present disclosure is to provide a technology that enables accurate detection of abnormalities of electrically heated catalysts provided with a heating element having NTC characteristics.

To solve the above problem, an abnormality detection apparatus for an electrically heated catalyst according to the present disclosure detects an abnormality of the electrically heated catalyst on the basis of an accomplishment ratio defined as a ratio of an actually supplied electrical energy to a target electrical energy. The actually supplied electrical energy is defined as the integrated value of electrical power actually supplied to the electrically heated catalyst over a specific period from the start of supply of electrical power to the electrically heated catalyst to a specific time. The specific time is a time after the start of supply of electrical power to the electrically heated catalyst and before or simultaneous with the time when the actually supplied electrical power substantially reaches the target electrical power.

More specifically, an abnormality detection apparatus for an electrically heated catalyst according to the present disclosure comprises: an electrically heated catalyst provided in an exhaust passage of an internal combustion engine, including an exhaust gas purification catalyst and a heating element that generates heat when supplied with electrical power, the electrical resistance of the heating element being larger when its temperature is low than when it is high; and a controller including at least one processor.

The controller is configured to:

adjust an applied voltage defined as a voltage applied to the electrically heated catalyst in such a way as to make the electrical power as the product of the applied voltage and a catalyst current defined as the electrical current flowing through the electrically heated catalyst per unit time equal to a target electrical power to be supplied to the electrically heated catalyst and to adjust the applied voltage to a voltage substantially equal to a specific upper limit voltage when the electrical power that can be supplied to the electrically heated catalyst by applying a voltage equal to or lower than the specific upper limit voltage is lower than the target electrical power;

calculate an actually supplied electrical energy defined as the integrated value of the electrical power actually supplied to the electrically heated catalyst over a specific period from the time when the application of the applied voltage to the electrically heated catalyst by the controller is started to a specific time;

calculate a target electrical energy defined as the integrated value of the target electrical power over the specific period;

calculate an accomplishment ratio parameter relating to the ratio of the actually supplied electrical energy calculated by the controller to the target electrical energy calculated by the controller; and detect an abnormality of the electrically heated catalyst on the basis of the accomplishment ratio parameter calculated by the controller.

The specific time set in the abnormality detection apparatus for an electrically heated catalyst is a time after the time when the application of the applied voltage to the electrically heated catalyst by the controller is started and before or simultaneous with the time when the actually supplied electrical power substantially reaches the target electrical power.

When the temperature of the electrically heated catalyst (or exhaust gas purification catalyst) provided in a vehicle is low, as is the case when the internal combustion engine of the vehicle is cold-started, the controller applies a voltage (supplies electrical power) to the electrically heated catalyst before the startup of the internal combustion engine to cause a heating element to generate heat, thereby preheating the exhaust gas purification catalyst. In this process, the controller controls the applied voltage in such a way as to make the electrical power as the product of the voltage applied to the electrically heated catalyst (which will be referred to as "applied voltage") and the current flowing through the electrically heated catalyst per unit time (which will be referred to as "catalyst current") equal to a target electrical power to be supplied to the electrically heated catalyst (namely, a target value of the electrical power to be supplied to the electrically heated catalyst). The target electrical power is a constant value that is set taking account of factors such as the structure and performance of a device(s) used to supply electrical power to the electrically heated catalyst (e.g. a battery, a generator, and/or a DC-to-DC converter) and/or the temperature of the electrically heated catalyst at the time when the supply of electrical power is started.

When the electrically heated catalyst (or its heating element) has NTC characteristics, the electrical resistance of the electrically heated catalyst tends to be larger when its temperature is low than when it is high. In consequence, when the temperature of the electrically heated catalyst is relatively low, the electrical resistance of the electrically heated catalyst is relatively large. This is generally the case just after the start of the supply of electrical power to the electrically heated catalyst. The voltage that can be applied to the electrically heated catalyst has a certain upper limit that is determined by the structure and performance of the device(s) used to supply electrical power to the electrically heated catalyst. Therefore, when the electrical resistance of the electrically heated catalyst is large due to its low temperature (because of NTC characteristics of the electrically heated catalyst), the applied voltage is limited to the aforementioned upper limit, leading to insufficient catalyst current. This is generally the case just after the start of the supply of electrical power to the electrically heated catalyst. Therefore, in a period just after the supply of electrical power to the electrically heated catalyst is started, the electrical power actually supplied to the electrically heated catalyst (which will be referred to as the actual electrical power) is smaller than the target electrical power. As the supply of electrical power to the electrically heated catalyst continues, the temperature of the electrically heated catalyst rises, and the electrical resistance of the electrically heated catalyst decreases accordingly, making the catalyst current larger. When the temperature of the electrically heated catalyst rises to a certain temperature during the supply of electrical power to the electrically heated catalyst, the actual electrical power supplied to the electrically heated catalyst becomes substantially equal to the target electrical power, even though the applied voltage is limited below the upper limit. Thus, the cleaning performance of the electrically heated catalyst during and just after the startup of the internal combustion engine is enhanced even if the electrically heated catalyst has NTC characteristics.

If an abnormality such as oxidation of the heating element or electrodes or a crack thereof occurs, there is a possibility that the electrical resistance of the electrically heated catalyst may become larger than that in the normal condition. When this is the case, the difference between the actual electrical power and the target electrical power tends to be large, possibly making it difficult to preheating the electrically heated catalyst effectively in a limited time before the startup of the internal combustion engine. Therefore, it is necessary to detect such an abnormality with high accuracy.

As described above, in the case where the electrically heated catalyst (or its heating element) has NTC characteristics, the electrical resistance of the electrically heated catalyst is smaller when temperature of the electrically heated catalyst is high than when it is low, and the actual electrical power supplied to the electrically heated catalyst is larger accordingly. Therefore, if the supply of electrical power to the electrically heated catalyst continues to some extent, the electrical resistance of the electrically heated catalyst decreases with rise of the electrically heated catalyst, and consequently the actual electrical power can increase to substantially reach the target electrical power, even if the electrically heated catalyst has an abnormality. After the actual electrical power has increased to substantially reach the target electrical power, the ratio of the actually supplied electrical energy to the target electrical energy can be high, even if the electrically heated catalyst has an abnormality. This ratio will also be referred to as the accomplishment ratio hereinafter.

The abnormality detection apparatus according to the present disclosure detects an abnormality of the electrically heated catalyst on the basis of the accomplishment ratio at the specific time after a lapse of a predetermined period of time since the start of supply of electrical power to the electrically heated catalyst. The specific time is set as a time after the time when the application of the applied voltage to the electrically heated catalyst is started and before or simultaneous with the time when the actually supplied electrical power substantially reaches the target electrical power. As above, the abnormality detection apparatus is configured to perform abnormality detection of the electrically heated catalyst on the basis of the accomplishment ratio at a time when the temperature of the electrically heated catalyst is relatively low, in other words, when the difference between the actual electrical power and the target electrical power attributable to an abnormality of the electrically heated catalyst tends to be large. Therefore, the abnormality detection apparatus according to the present disclosure is capable of detecting an abnormality of the electrically heated catalyst with high accuracy.

The aforementioned specific time may be set to the time when the actual electrical power substantially reaches the target electrical power after the start of supply of electrical power to the electrically heated catalyst. This is because the difference between the accomplishment ratio with the electrically heated catalyst in a normal condition and that with the electrically heated catalyst in an abnormal condition tends to be larger at the time when the actual electrical power substantially reaches the target electrical power than at times before that. Therefore, the abnormality detection apparatus according to the present disclosure is capable of detecting an abnormality of the electrically heated catalyst with improved accuracy.

The controller according to the present disclosure may calculate a supplied electrical energy ratio defined as the ratio of the actually supplied electrical energy to the target electrical energy as the accomplishment ratio parameter. In this case, the controller may determine that the electrically heated catalyst is abnormal if the supplied electrical energy ratio calculated by the controller is lower than a predetermined ratio.

As described above, the electrical resistance of the electrically heated catalyst is larger when the electrically heated catalyst is abnormal than when it is normal. In consequence, the supplied electrical energy ratio is smaller when the electrically heated catalyst is abnormal than when it is normal. The supplied electrical energy ratio with the electrically heated catalyst in an abnormal condition tends to be smaller before the time when the actual electrical power substantially reaches the target electrical power than after that time. Therefore, if the abnormality detection apparatus performs detection of an abnormality of the electrically heated catalyst by comparing the supplied electrical energy ratio at the aforementioned specific time with the predetermined ratio, the abnormality detection apparatus can determine whether the electrically heated catalyst is normal or abnormal with high accuracy. The predetermined ratio mentioned above is such a ratio that if the supplied electrical energy ratio at the aforementioned specific time is smaller than the predetermined ratio, it may be determined that the electrically heated catalyst is abnormal. In other words, the predetermined ratio is such a ratio that if the supplied electrical energy ratio at the aforementioned specific time is smaller than the predetermined ratio, it is difficult to preheat the electrically heated catalyst effectively.

The accomplishment ratio parameter according to the present disclosure is not limited to the supplied electrical energy ratio. For example, the value used as the accomplishment ratio parameter may be a supplied electrical energy difference defined as the difference between the actually supplied electrical energy calculated by the controller and the target electrical energy calculated by the controller.

The present disclosure enables an abnormality detection apparatus to accurately detect an abnormality of an electrically heated catalyst provided with a heating element having NTC characteristics.

BRIEF DESCRIPTION OF DRAWINGS

FIG. 1 is a diagram illustrating the general configuration of a vehicle to which the present disclosure is applied.

FIG. 2 is a diagram illustrating the general configuration of an electrically heated catalyst (EHC).

FIG. 3 is a graph illustrating relationship between the soak time and the bed temperature Tcat.

FIG. 4 illustrates changes of the actual electrical power Wr, the actually supplied electrical energy ΣWr, and the bed temperature Tcat of a catalyst carrier with time during a period from the start to the end of supply of electrical energy to the EHC.

FIG. 5 is a graph illustrating relationship between the bed temperature Tcat of the catalyst carrier and the electrical resistance Rcat of the EHC.

FIG. 6 illustrates changes of the actual electrical power Wr, the actually supplied electrical energy ΣWr, and the supplied electrical energy ratio Prw with time in a case where preheating is performed when the EHC has an abnormality.

FIG. 7 is a flow chart of a processing routine executed by the ECU in an abnormality detection process according to an embodiment.

DESCRIPTION OF EMBODIMENTS

In the following, a specific embodiment of the present disclosure will be described with reference to the drawings. The dimensions, materials, shapes, relative arrangements, and other features of the components that will be described in connection with the embodiments are not intended to limit the technical scope of the present disclosure only to them, unless otherwise stated.

Embodiment

FIG. 1 is a diagram illustrating the general configuration of a vehicle to which the present disclosure is applied. The vehicle 100 illustrated in FIG. 1 is provided with a hybrid system that drives wheels (driving wheels) 58. The hybrid system includes an internal combustion engine 1, a power split device 51, an electric motor 52, a generator 53, a battery 54, a power control unit (PCU) 55, an axle (or drive shaft) 56, and a reduction gear 57.

The internal combustion engine 1 is a spark-ignition internal combustion engine (or gasoline engine) having a plurality of cylinders 1a. The internal combustion engine 1 has ignition plugs 1b, each of which ignites air-fuel mixture formed in each cylinder 1a. While the internal combustion engine 1 illustrated in FIG. 1 has four cylinders, the present disclosure may be applied to internal combustion engines having less or more than four cylinders. Alternatively, the internal combustion engine 1 may be a compression-ignition internal combustion engine (or diesel engine). The output shaft (or crankshaft) of the internal combustion engine 1 is connected to the rotary shaft of the generator 53 and the rotary shaft of the electric motor 52 through the power split device 51.

The rotary shaft of the generator 53 is connected to the crankshaft of the internal combustion engine 1 through the power split device 51 and generates electrical power mainly using the kinetic energy of the crankshaft. The electric motor 53 can also function as a starter motor by rotating the crankshaft through the power split device 51 when starting the internal combustion engine 1. The electrical power generated by the generator 53 is supplied to the electric motor 52 or stored in the battery 54 by the PCU 55.

The rotary shaft of the electric motor 52 is connected to the axle 56 through the reduction gear 57 and capable of rotating the wheels 58 using the electrical power supplied from the battery 54 or the generator 53 through the PCU 55. The rotary shaft of the electric motor 52 is connected to the power split device 51 also, and the electric motor 52 is capable of assisting the internal combustion engine 1 in rotating the wheels 58.

The power split device 51 includes a planetary gear device. The power split device 51 splits power among the internal combustion engine 1, the electric motor 52, and the generator 53. For example, the power split device 51 control the travelling speed of the vehicle 100 by causing the electric motor 52 to operate with controlled power generated by the generator 53 while causing the internal combustion engine 1 to operate in the most efficient operation range.

The PCU 55 includes an inverter, a step-up converter, and a DC-to-DC converter. The PCU 55 converts direct current power supplied from the battery 54 into alternating current power to supply it to the electric motor 52, converts the alternating current power supplied from the generator 53 into direct current power to supply it to the battery 54, transforms the voltage of power between the inverter and the battery 54, and transforms the voltage of power supplied from the battery 54 to an electrically heated catalyst (EHC) 2, which will be described later.

The internal combustion engine 1 has fuel injection valves (not shown) each of which injects fuel into each cylinder 1a or intake port. Air-fuel mixture formed by air and fuel injected through the fuel injection valve is ignited by the ignition plug 1b and burns to generate thermal energy, which is used to rotate the crankshaft.

The internal combustion engine 1 is connected with an intake pipe 10. The intake pipe 10 delivers fresh air taken in from the atmosphere to the cylinders of the internal combustion engine 1. The intake pipe 10 is provided with an air flow meter 12 and a throttle valve 13. The air flow meter 12 outputs an electrical signal relating to the mass of the air supplied to the internal combustion engine 1 (or intake air quantity). The throttle valve 13 varies the channel cross sectional area in the intake pipe 10 to control the intake air quantity of the internal combustion engine 1.

The internal combustion engine 1 is also connected with an exhaust pipe 11, through which burned gas (or exhaust gas) burned in the cylinders of the internal combustion engine 1 flows. The exhaust pipe 11 is provided with an EHC 2 as an exhaust gas purification catalyst. The EHC 2 is provided with a heater that generates heat by electrical current supplied to it. The exhaust pipe 11 is provided with an air-fuel ratio sensor (A/F sensor) 14 and a first exhaust gas temperature sensor 15, which are arranged upstream of the EHC 2. The A/F sensor 14 outputs an electrical signal relating to the air-fuel ratio of the exhaust gas. The first exhaust gas temperature sensor 15 outputs an electrical signal relating to the temperature of the exhaust gas flowing into the EHC 2. The exhaust pipe 11 is also provided with a second exhaust gas temperature sensor 16, which is arranged downstream of the EHC 2. The second exhaust gas temperature sensor 16 outputs an electrical signal relating to the temperature of the exhaust gas flowing out of the ECH 2. Alternatively, the exhaust pipe 11 may be provided with only one of the first and second exhaust gas temperature sensors 15, 16, in other words one of the first and second exhaust gas temperature sensors 15, 16 may be eliminated.

An electronic control unit (ECU) 20 is provided for the above-described hybrid system. The ECU 20 is an electronic control unit including a CPU, a ROM, a RAM, and a backup RAM.

The ECU 20 is electrically connected with the air flow meter 12, the A/F sensor 14, the first exhaust gas temperature sensor 15, the second exhaust gas temperature sensor 16, and an accelerator position sensor. The accelerator position sensor 17 outputs an electrical signal relating to the amount of depression of the accelerator pedal (or accelerator opening degree).

The ECU 20 controls the internal combustion engine 1 and its peripheral devices (such as the ignition plugs 1b, the throttle valve 13, and the fuel injection valves), the electric motor 52, the generator 53, the PCU 55, and the EHC 2 based on the signals output from the aforementioned sensors. The ECU 20 may be divided into an ECU that controls the hybrid system overall and an ECU that controls the internal combustion engine 1 and its peripheral devices.

The general configuration of the EHC 2 will now be described with reference to FIG. 2. The arrow in FIG. 2 indicates the direction of flow of exhaust gas. The EHC 2 includes a catalyst carrier 3 having a cylindrical shape, an inner cylinder 6 having a cylindrical shape that covers the catalysts carrier 3, and a cylindrical case 4 that covers the inner cylinder 6. The catalyst carrier 3, the inner cylinder 6, and the case 4 are arranged coaxially.

The catalyst carrier 3 is a structure having a plurality of passages extending along the direction of exhaust gas flow and arranged in a honeycomb pattern. The catalyst carrier 3 has a cylindrical outer shape. The catalyst carrier 3 carries an exhaust gas purification catalyst 31. The exhaust gas purification catalyst 31 may be an oxidation catalyst, a three-way catalyst, an NOx storage reduction (NSR) catalyst, a selective catalytic reduction (SCR) catalyst, or a combination of such catalysts. The base material of the catalyst carrier 3 is a material having a relatively high electrical resistance that increases with rise of its temperature (namely, a material having NTC characteristics) and functions as a heating element. An example of such a material is a porous ceramic (e.g. SiC).

The inner cylinder 6 is an insulator with low conductivity and high heat resistance (e.g. alumina or stainless steel coated with an insulation layer on its surface) that is shaped as a cylinder. The inner cylinder 6 is dimensioned to have an inner diameter larger than the outer diameter of the catalyst carrier 3.

The case 4 is a housing made of a metal (e.g. stainless steel) that houses the catalyst carrier 3 and the inner cylinder 6. The case 4 has a cylindrical portion having an inner diameter larger than the outer diameter of the inner cylinder 6, an upstream conical portion joining to the upstream end of the cylindrical portion, and a downstream conical portion joining to the downstream end of the cylindrical portion. The upstream conical portion and the downstream conical portion are tapered in such a way that their inner diameters decrease as they extend away from the cylindrical portion.

A cylindrical mat member 5 is press-fitted in the gap between the inner circumference of the inner cylinder 6 and the outer circumference of the catalyst carrier 3, and another mat member 5 is press-fitted in the gap between the inner circumference of the case 4 and the outer circumference of the inner cylinder 6. The mat member 5 is made of a low-conductive insulating material that provides high cushioning (e.g. an inorganic fiber mat, such as an alumina fiber mat).

The EHC 2 has two through-holes 9 that pass through the case 4, the mat members 5, and the inner cylinder 6. The through holes 9 are located at opposed positions on the outer circumference of the case 4. Electrodes 7 are provided in the respective through-holes 9. Each electrode 7 includes a surface electrode 7a that extends circumferentially and axially along the outer circumference of the catalyst carrier 3 and a stem electrode 7b that extends from the outer circumference of the surface electrode 7a to the outside of the case 4 through the through-hole 9.

A support member 8 is provided between the case 4 and the stem electrode 7b in the through-hole 9 to support the stem electrode 7b. The support member 8 is adapted to stop the annular gap between the case 4 and the stem electrode 7b. The support member 8 is made of an insulating material with low conductivity to prevent short-circuit between the stem shaft 7b and the case 4.

The stem electrodes 7b are connected to the output terminals of the battery 54 through a power supply control unit 18 and the PCU 55. The power supply control unit 18 is a unit controlled by the ECU 20 and has the functions of applying a voltage to the electrodes 7 from the battery 54 through the PCU 55 (i.e. power supply to the EHC 2), controlling the voltage applied to the EHC 2 (or applied voltage) from the battery 54 through the PCU 55, and sensing the current flowing between the electrodes 7 of the EHC 2 per unit time (or catalyst current).

With the above configuration of the EHC 2, when the power supply control unit 18 applies a voltage from the battery 54 to the electrodes 7 through the PCU 55 to energize (in other words, supply electrical power to) the EHC 2, the catalyst carrier 3 behaves as a resistor to generate heat. In consequence, the exhaust gas purification catalyst 31 carried by the catalyst carrier 3 is heated. Thus, if the EHC 2 is energized when the temperature of the exhaust gas purification catalyst 31 is low, it is possible to raise the temperature of the exhaust gas purification catalyst 31 promptly. In particular, energizing the EHC 2 before the startup of the internal combustion engine 1 can reduce the exhaust emissions during and just after the startup of the internal combustion engine 1.

In the following, a method of controlling the EHC 2 according to the embodiment will be described. The power supply control unit 18 is controlled in such a way as to energize the EHC 2 if the internal combustion engine 1 is not operating and the temperature of the catalyst carrier 3 is lower than a specific temperature (e.g. a temperature at which the exhaust gas purification catalyst 31 carried by the catalyst carrier 3 is made active) while the hybrid system is in an activated state (that is, a state in which the system can drive the vehicle).

Specifically, when the hybrid system is activated, the ECU 20 firstly senses the state of charge (SOC) of the battery 54. The SOC is the ratio of the amount of electrical energy that the battery 54 can discharge at present to the maximum electrical energy that the battery 54 can store (namely, the electrical energy stored in the fully-charged battery). The SOC is calculated by integrating the current charged into and discharged from the battery 54.

The ECU 20 determines the temperature of the central portion of the catalyst carrier 3 at the time of activation of the hybrid system. This temperature will also be referred to as the "bed temperature" hereinafter. Specifically, the ECU 20 estimates the bed temperature at that time on the basis of the bed temperature Tend at the time when the operation of the internal combustion engine 1 was stopped last time and the time elapsed from the time when the operation of the internal combustion engine 1 was stopped last time to the time of activation of the hybrid system, namely the soak time.

FIG. 3 shows the relationship between the bed temperature Tcat of the catalyst carrier 3 and the soak time. After the operation of the internal combustion engine 1 is stopped (at t0 in FIG. 3), the catalyst temperature Tcat of the catalyst carrier 3 falls with time from the bed temperature Tend at the time when the operation of the internal combustion engine 1 is stopped last time. The bed temperature Tcat of the catalyst carrier 3 decreases to eventually become close to the ambient temperature Tatm (at t1 in FIG. 3), and thereafter the bed temperature Tcat is stable at a temperature equal to or close to the ambient temperature Tatm. The system according to the embodiment determines the relationship shown in FIG. 3 in advance by experiment or simulation and stores this relationship in the ROM or other component of the ECU 20 as a map or a function expression that enables determination of the bed temperature at the time of activation of the hybrid system from the bed temperature Tend at the time of stopping of the operation of the internal combustion engine 1 and the soak time as arguments. Alternatively, the bed temperature Tend at the time of stopping of the operation of the internal combustion engine 1 may be estimated from the measurement values of the first exhaust gas temperature sensor 15 and/or the second exhaust gas temperature sensor 16 immediately before the stopping of the operation of the internal combustion engine 1 or from the history of the previous operation of the internal combustion engine 1.

Then, the ECU 20 determines whether or not the bed temperature of the catalyst carrier 3 at the time of activation of the hybrid system is lower than a specific temperature. If the bed temperature of the catalyst carrier 3 at the time of activation of the hybrid system is lower than the specific temperature, the ECU 20 calculates the amount of electrical energy that is required to be supplied to the EHC 2 to raise the bed temperature of the catalyst carrier 3 to the specific temperature. This electrical energy will be referred to as the "standard amount of electrical energy" hereinafter. The standard amount of electrical energy calculated is larger when the bed temperature of the catalyst carrier 3 at the time of activation of the hybrid system is low than when it is high. Then, the ECU 20 calculates a consumption SOCcom of the SCO that will result if the standard amount of electrical energy is supplied to the EHC 2. Then, the ECU 20 calculates the remaining amount ΔSOC of the SOC by subtracting the consumption SOCcom from the SOC at the time of activation of the hybrid system (ΔSOC=SOC−SOCcom). The ECU 20 determines whether or not the remaining amount ΔSOC thus calculated is larger than a lower limit. This lower limit is a value of SOC below which it is considered necessary to charge the battery 54 by starting the internal combustion engine 1.

If the remaining amount ΔSOC is larger than the lower limit, the ECU 20 starts the supply of electrical power to the EHC 2 at the time when the SOC becomes equal to the sum of the consumption SOCcom and the lower limit plus a margin. If the remaining amount ΔSOC is larger than an amount that enables the vehicle 100 to travel in the EV mode (the mode in which the vehicle 100 is driven by the electric motor 52 only) for a certain length of time, the vehicle 100 may be driven only by the electric motor 52 when a request for driving the vehicle 100 is made, and the supply of electrical power to the EHC 2 may be started. The aforementioned "certain length of time" is, for example, a length of time longer than the length of time required to supply the standard amount of electrical energy to the EHC 2.

When supplying electrical power to the EHC 2, the ECU 20 sets a target value of electrical power (target electrical power) to be supplied to the EHC 2. The target electrical power is a constant value that is set taking account of factors such as the structure and performance of the devices used to supply electrical power to the EHC 2 (e.g. the generator 53, the battery 54, and the PCU 55) and/or the bed temperature of the catalyst carrier 3 at the time of starting the supply of electrical power. The ECU 20 controls the power supply control unit 18 in such a way as to adjust the electrical power supplied to the EHC 2 to the target electrical power. The electrical power supplied to the EHC 2 is the product of the voltage applied to the electrodes 7 of the EHC 2 (which will be referred to as "applied voltage") and the current flowing between the electrodes 7 of the EHC 2 per unit time (which will be referred to as the "catalyst current").

FIG. 4 illustrates changes in the electrical power actually supplied to the EHC 2 (which will be referred to as "actual electrical power Wr" hereinafter), the integrated value of the actual electrical power (which will be referred to as "actually supplied electrical energy ΣWr"), and the bed temperature Tcat of the catalyst carrier 3 with time during the period from the start to the end of the supply of electrical power to the EHC 2.

As illustrated in FIG. 4, the actual electrical power Wr is lower than the target power Wtrg during the period from the start of the supply of electrical power to the EHC 2 (at t10 in FIG. 4) to time t20 in FIG. 4. This is because the catalyst carrier 3 of the EHC 2 has NTC characteristics and the voltage that can be applied to the EHC 2 is lower than a specific upper limit. Specifically, when the catalyst carrier 3 has NTC characteristics, the electrical resistance of the catalyst carrier 3 is larger when the bed temperature Tcat of the catalyst carrier 3 is low than when it is high, and accordingly the electrical resistance Rcat of the EHC 2 overall including the catalyst carrier 3 and the electrodes 7 (in other words, the electrical resistance between the electrodes 7) is larger when the bed temperature Tcat of the catalyst carrier 3 is low than when it is high, as will be seen in FIG. 5. Therefore, when the bed temperature Tcat of the catalyst carrier 3 is relatively low, as is the case just after the start of the supply of electrical power to the EHC 2, the electrical resistance Rcat of the EHC 2 is relatively large. The voltage that can be applied to the EHC 2 has a design upper limit (specific upper limit voltage) that is determined by the structure and performance of the device used to supply electrical power to the EHC 2. Therefore, when the bed temperature Tcat of the catalyst carrier 3 is relatively low, as is the case just after the start of electrical power supply to the EHC 2, since the electrical resistance Rcat of the catalyst carrier 3 is relatively large because of its NTC characteristics, the catalyst current will be unduly small even if the voltage as high as the specific upper limit voltage is applied to the EHC 2, resulting in actual electrical power Wr lower than the target electrical power Wtrg.

As the voltage as high as the upper limit voltage continues to be applied to the EHC 2 during the period from t10 to t20 in FIG. 4, the bed temperature Tcat of the catalyst carrier 3 rises from the temperature T0 at the time of starting the supply of electrical power with time, and the electrical resistance Rcat of the EHC 2 decreases with time consequently. In consequence, the catalyst current increases with time, and the actual electrical power Wr also increases with time accordingly. Eventually at time t20 in FIG. 4, the electrical resistance Rcat of the EHC 2 becomes so small that the actual electrical power Wr under the application of the upper limit voltage to the EHC 2 becomes substantially equal to the target electrical power Wtrg. After time t20 in FIG. 4, it is possible to keep the actual electrical power Wr substantially equal to the target electrical power Wtrg by decreasing the voltage applied to the EHC 2 with time as the bed temperature Tcat of the catalyst carrier 3 rises with time, in other words as the electrical resistance Rcat of the EHC 2 decreases with time. Specifically, the power supply control unit 18 measures the catalyst current (i.e. the current flowing between the electrodes 7 of the EHC 2 per unit time) and adjusts the applied voltage (i.e. the voltage resulting from transformation by the PCU 55) in such a way as to make the product of the measured catalyst current and the applied voltage (which is the actual electrical power Wr) substantially equal to the target electrical power Wtrg. When the actually supplied electrical energy ΣWr reaches the standard amount of electrical energy ΣWbase eventually (at t40 in FIG. 4), the bed temperature Tcat of the catalyst carrier 3 reaches the specific temperature Ttrg. Then, the ECU 20 controls the power supply control unit 18 to stop the supply of electrical power to the EHC 2.

As above, if the standard amount of electrical energy ΣWbase is supplied to the EHC 2 before the startup of the internal combustion engine 1, the catalyst carrier 3 and the exhaust gas purification catalyst 31 carried by the catalyst carrier 3 are heated to or above the specific temperature Ttrg. In consequence, the purification performance of the exhaust gas purification catalyst 31 during and just after the startup of the internal combustion engine 1 is enhanced, leading to reduced exhaust emissions. In the following, the above-described process of preheating the exhaust gas purification catalyst 31 before the startup of the internal combustion engine 1 will be referred to as the "preheat process".

If an abnormality such as oxidation of the catalyst carrier 3 or the electrodes 7 or a crack thereof occurs in the EHC 2, there is a possibility that the electrical resistance Rcat of the EHC 2 may become larger than that of the EHC 2 in the normal condition. When this is the case, the actual electrical power Wr becomes lower than that in the normal condition, and consequently the time (or power supply time) required to supply the standard amount of electrical energy ΣWbase to the EHC 2 may increase unduly. This may lead to difficulties in raising the bed temperature Tcat of the catalyst carrier 3 to the specific temperature Ttrg in a limited time before the startup of the internal combustion engine 1.

FIG. 6 illustrates changes in the actual electrical power Wr, the actually supplied electrical energy ΣWr, and the ratio Prw of the actually supplied electrical energy ΣWr to a target electrical energy ΣWtrg with time in a case where the preheat process is performed while an abnormality like those mentioned above is occurring in the EHC 2. The aforementioned ratio Prw will be hereinafter referred to as the "supplied electrical energy ratio". In FIG. 6, the solid curves represent changes in the actual electrical power Wr1, the actually supplied electrical energy ΣWr1, and the supplied electrical energy ratio Prw1 in a case where the EHC 2 has an abnormality. The dot-dot-dash curves in FIG. 6 represent changes in the actual electrical power Wr0, the actually supplied electrical energy ΣWr0, and the supplied electrical energy ratio Prw0 with time in a case where the EHC 2 is normal. The dot-dash curves in FIG. 6 represent changes in the target electrical power Wtrg and the target electrical energy ΣWtrg with time.

In FIG. 6, during the period from the start of power supply to the EHC 2 (at t10 in FIG. 6) to the time when the actual electrical power Wr0 with the EHC 2 in the normal condition substantially reaches the target electrical power Wtrg (t20 in FIG. 6), the actual electrical power Wr0 with the EHC 20 in the normal condition is higher than the actual electrical power Wr1 with the EHC 2 in the abnormal condition, while both the actual electrical power Wr0 with the EHC 2 in the normal condition and the actual electrical power Wr1 with the EHC 2 in the abnormal condition disagree with the target electrical power Wtrg. This is because the electrical resistance of the EHC 2 is larger when the ECH 2 is abnormal than when it is normal. In consequence, during the period from t10 to t20 in FIG. 6, the actually supplied electrical energy ΣWr0 with the EHC 2 in the normal condition is higher than the actually supplied electrical energy ΣWr1 with the EHC 2 in the abnormal condition, and the supplied electrical energy ratio Prw0 with the EHC 2 in the normal condition is higher than the supplied electrical energy ratio Pwr1 with the EHC 2 in the abnormal condition. During the period from the time when the actual electrical power Wr0 with the EHC 2 in the normal condition substantially reaches the target electrical power Wtrg (t20 in FIG. 6) to the time when the actual electrical power Wr1 with the EHC 2 in the abnormal condition substantially reaches the target electrical power Wtrg (t20' in FIG. 6), while the actual electrical power Wr0 with the EHC 2 in the normal condition is substantially equal to the target electrical power Wtrg, the actual electrical power Wr1 with the EHC 2 in the abnormal condition is lower than the target electrical power Wtrg. In consequence, the difference between the actually supplied electrical energy ΣWr0 with the EHC 2 in the normal condition and the actually supplied electrical energy ΣWr1 with the EHC 2 in the abnormal condition increases with time during this period. Accordingly, the difference between the supplied electrical energy ratio Prw0 with the EHC 2 in the normal condition and the supplied electrical energy ratio Prw1 with the EHC 2 in the abnormal condition also increases with time. After the time when the actual electrical power Wr1 with the EHC 2 in the abnormal condition substantially reaches the target electrical power Wtrg (t20' in FIG. 6), both the actual electrical power Wr0 with the EHC 2 in the normal condition and the actual electrical power Wr1 with the EHC 2 in the abnormal condition are substantially equal to the target electrical power Wtrg, and therefore the rate of increase (i.e. the increase per unit time) of the actually supplied electrical energy ΣWr0 with the EHC 2 in the normal condition and the rate of increase of the actually supplied electrical energy ΣWr1 with the EHC 2 in the abnormal condition are substantially equal. On the other hand, the rate of increase of the supplied electrical energy ratio Prw1 with the EHC 2 in the abnormal condition is higher than the rate of increase of the supplied electrical energy ratio Prw0 with the EHC 2 in the normal condition during this period. Therefore, after the time when the actual electrical power Wr1 with the EHC 2 in the abnormal condition substantially reaches the target electrical power Wtrg (t20' in FIG. 6), the difference between the supplied electrical energy ratio Prw0 with the EHC 2 in the normal condition and the supplied electrical energy ratio Pwr1 with the EHC 2 in the abnormal condition decreases with time. To summarize, the difference between the supplied electrical energy ratio Prw0 with the EHC 2 in the normal condition and the supplied electrical energy ratio Pwr1 with the EHC 2 in the abnormal condition tends to increase during the period from the start of power supply to the EHC 2 (at t10 in FIG. 6) to the time when the actual electrical power Wr1 with the EHC 2 in the abnormal condition substantially reaches the target electrical power Wtrg (t20' in FIG. 6) and tends to decrease in the period after the time when the actual electrical power Wr1 with the EHC 2 in the abnormal condition substantially reaches the target electrical power Wtrg (t20' in FIG. 6).

In this embodiment, detection of an abnormality of the EHC 2 is performed based on the supplied electrical energy ratio Prw at a specific time during the period from the start of power supply to the EHC 2 to the time when the actual electrical power Wr substantially reaches the target electrical power Wtrg. Specifically, if the supplied electrical energy ratio Prw at the specific time is lower than a predetermined ratio Pthre, it is determined that the EHC 2 is abnormal. The predetermined ratio Pthre mentioned above is a value of the supplied electrical energy ratio Prw at the specific time below which it may be determined that the EHC 2 is abnormal. In other words, the predetermined ratio Pthre is such a ratio that if the supplied electrical energy ratio Prw at the specific time is lower than the predetermined ratio Pthre, it is difficult to preheat the EHC 2 effectively in a limited time before the startup of the internal combustion engine 1. The predetermined ratio Pthre is a value equal to the supplied electrical energy ratio Prw with the EHC 2 in the normal condition plus a margin that is set taking account of aged deterioration and variations of the EHC 2. The aforementioned specific time may be a time after the start of the supply of electrical power to the EHC 2 and before or simultaneous with the time when the actual electrical power Wr substantially reaches the target electrical power Wtrg. In view of the tendencies described above with reference to FIG. 6, the difference between the supplied electrical energy ratio Prw0 with the EHC 2 in the normal condition and the supplied electrical energy ratio Prw1 with the EHC 2 in the abnormal condition tends to be largest at the time when the actual electrical power Wr1 with the EHC 2 in the abnormal condition substantially reaches the target electrical power Wtrg (t20' in FIG. 6). Therefore, if the aforementioned specific time is set to the time when the actual electrical power Wr substantially reaches the target electrical power Wtrg, the accuracy of abnormality detection can be enhanced. For this reason, the specific time is set to the time when the actual electrical power Wr substantially reaches the target electrical power Wtrg, in this embodiment.

(Process of Abnormality Detection)

In the following, a process of abnormality detection according to the embodiment will be described with reference to FIG. 7. FIG. 7 is a flow chart of a processing routine performed by the ECU 20 in the abnormality detection according to the embodiment. The processing routine according to the flow chart of FIG. 7 is executed by the ECU 20 and triggered by the start of the above-described preheat process. This processing routine is stored in a ROM or the like of the ECU 20 in advance.

Firstly in step S101 of the processing routine according to the flow chart of FIG. 7, the ECU 20 determines whether or not the preheat process has been started. If a negative determination is made in step S101, the ECU 20 terminates the execution of this processing routine. If an affirmative determination is made in step S101, the ECU 20 proceeds to the processing of step S102.

In step S102, the ECU 20 acquires a target electrical power Wtrg set in the preheat process. The target electrical power Wtrg is a constant value that is set taking account of the structure and performance of the device used to supply electrical power to the EHC 2 and/or the bed temperature Tcat of the catalyst carrier 3 at the time when the supply of electrical power is started.

In step S103, the ECU 20 calculates the target electrical energy ΣWtrg. Specifically, the ECU 20 calculates the target electrical energy ΣWtrg by adding the target electrical power Wtrg acquired by the processing of step S102 to the previous value ΣWtrgold of the target electrical energy (ΣWtrg =ΣWtrgold +Wtrg). The target electrical energy ΣWtrg is the integrated value of the target electrical power over the period from the start of the supply of electrical power to the EHC 2 to the present time.

In step S104, the ECU 20 acquires the voltage Vehc applied to the electrodes 7 of the EHC 2 (applied voltage) in the preheat process. Then, the ECU 20 proceeds to step S105, where the ECU 20 measures the current (catalyst current) Iehc flowing between the electrodes 7 of the EHC 2 per unit time when the aforementioned applied voltage Vehc is applied to the electrodes 7 by the power supply control unit 18. In step S106, the ECU 20 calculates the electrical power Wr actually supplied to the EHC 2 (actual electrical power) as the product of the applied voltage Vehc acquired by the processing of step S104 and the catalyst current Iehc measured by the process of step S105 (Wr=Vehc*Iehc).

In step S107, the ECU 20 calculates the actually supplied electrical energy ΣWr. Specifically, the ECU 20 adds the electrical power Wr calculated by the processing of step S106 to the previous value ΣWrold of the actually supplied electrical energy to calculate the actually supplied electrical energy ΣWr, which is the integrated value of the actual electrical power over the period from the start of the supply of electrical power to the EHC 2 to the present time.

In step S108, the ECU 20 determines whether or not the actual electrical power WR calculated by the processing of step S106 is higher than or equal to the target electrical power Wtrg acquired by the processing of step S102. In cases where the specific time is set to a time earlier than the time when the actual electrical power Wr substantially reaches the target electrical power Wtrg, the ECU 20 may determine whether or not the actual electrical power Wr calculated by the processing of step S106 is higher than or equal to a predetermined electrical power lower than the target electrical power Wtrg acquired by the processing of step S102. The predetermined electrical power in this case may be determined in advance by an experiment or simulation.

If a negative determination is made in step S108 (Wr<Wtrg), the ECU 20 returns to the processing of step S103. If an affirmative determination is made in step S108 (Wr≥Wtrg), the ECU 20 proceeds to the processing of step S109.

In step S109, the ECU 20 calculates the supplied electrical energy ratio Prw by dividing the actually supplied electrical energy ΣWr calculated by the processing of step S107 by the target electrical energy ΣWtrg calculated by the processing of step S103.

In step S110, the ECU 20 determines whether or not the supplied electrical energy ratio Prw calculated by the processing of step S109 is smaller than the predetermined ratio Pthre. As described previously, the predetermined ratio Pthre is such a ratio that if the supplied electrical energy ratio Prw at the specific time is lower than the predetermined ratio Pthre, it may be determined that the EHC 2 is abnormal. If an affirmative determination is made in step S110 (Prw<Pthre), the ECU 20 proceeds to the processing of step S111, where the ECU 20 determines that the EHC 2 is abnormal. If a negative determination is made in step S110 (Prw≥Prthre), the ECU 20 proceeds to the processing of step S112, where the ECU 20 determines that the EHC 2 is normal.

By performing abnormality detection of the EHC 2 by the above-described process according to the flow chart of FIG. 7, an abnormality of the EHC 2 can be detected with high accuracy, even in the case where the catalyst carrier 3 of the EHC 2 has NTC characteristics.

Modifications

In the above-described embodiment, an abnormality of the EHC 2 is detected by comparing the supplied electrical energy ratio Prw at the specific time with the predetermined ratio Pthre. Alternatively, an abnormality of the EHC 2 may be detected by comparing the difference between the target electrical energy ΣWtrg and the actually supplied electrical energy ΣWr at a specific time (which will also be referred to as "electrical energy difference") with a predetermined value. The reason for this is that the difference between the target electrical energy ΣWtrg and the actually supplied electrical energy ΣWr at a specific time is larger when the EHC 2 is abnormal than when it is normal.

REFERENCE SIGNS LIST

1: internal combustion engine
3: catalyst carrier
4: case
5: mat member
6: inner cylinder
7: electrode
8: support member
9: through-hole
10: intake pipe
11: exhaust pipe
15: first exhaust gas temperature sensor
16: second exhaust gas temperature sensor
18: power supply control unit
20: ECU
31: exhaust gas purification catalyst
54: battery
55: PCU

The invention claimed is:

1. An abnormality detection apparatus for an electrically heated catalyst comprising;
the electrically heated catalyst provided in an exhaust passage of an internal combustion engine, including an exhaust gas purification catalyst and a heating element that generates heat when supplied with electrical power, the electrical resistance of the heating element being larger when its temperature is low than when it is high; and
a controller including at least one processor,
the controller configured to:
adjust an applied voltage defined as a voltage applied to the electrically heated catalyst in such a way as to make the electrical power as the product of the applied voltage and a catalyst current defined as the electrical current flowing through the electrically heated catalyst per unit time equal to a target electrical power to be supplied to the electrically heated catalyst and to adjust the applied voltage to a voltage substantially equal to a specific upper limit voltage wherein the specific upper limit voltage is a design upper limit voltage determined by the structure and performance of the electrical power supply unit supplying power to the electrically heated catalyst, when the electrical power available to be supplied, based on a state of charge of a battery, to the electrically heated catalyst by applying a voltage equal to or lower than the specific upper limit voltage is lower than the target electrical power;
calculate an actually supplied electrical energy defined as the integrated value of the electrical power actually supplied to the electrically heated catalyst over a specific period from the time when the application of the applied voltage to the electrically heated catalyst by the controller is started to a specific time;
calculate a target electrical energy defined as the integrated value of the target electrical power over the specific period;
calculate an accomplishment ratio parameter equivalent to a ratio of the actually supplied electrical energy calculated by the controller to the target electrical energy calculated by the controller; and
detect an abnormality of the electrically heated catalyst on the basis of the accomplishment ratio parameter calculated by the controller,
wherein the specific time is a time after the time when the application of the applied voltage to the electrically heated catalyst by the controller is started and before or simultaneous with the time when the actually supplied electrical power substantially reaches the target electrical power.

2. An abnormality detection apparatus for an electrically heated catalyst according to claim 1, wherein the specific time is a time when the actual electrical power substantially reaches the target electrical power after the application of the applied voltage to the electrically heated catalyst by the controller is started.

3. An abnormality detection apparatus for an electrically heated catalyst according to claim 2, wherein the controller calculates a supplied electrical energy ratio defined as the ratio of the actually supplied electrical energy calculated by the controller to the target electrical energy calculated by the controller as the accomplishment ratio parameter, and the controller determines that the electrically heated catalyst is abnormal if the supplied electrical energy ratio calculated by the controller is lower than a predetermined ratio.

4. An abnormality detection apparatus for an electrically heated catalyst according to claim 1, wherein the controller calculates a supplied electrical energy ratio defined as the ratio of the actually supplied electrical energy calculated by the controller to the target electrical energy calculated by the controller as the accomplishment ratio parameter, and the controller determines that the electrically heated catalyst is abnormal if the supplied electrical energy ratio calculated by the controller is lower than a predetermined ratio.

* * * * *